Sept. 4, 1962 F. G. JACQUES 3,051,973
ABSORPTIVE EARTH-DRYING APPARATUS
Filed June 12, 1958 4 Sheets-Sheet 1
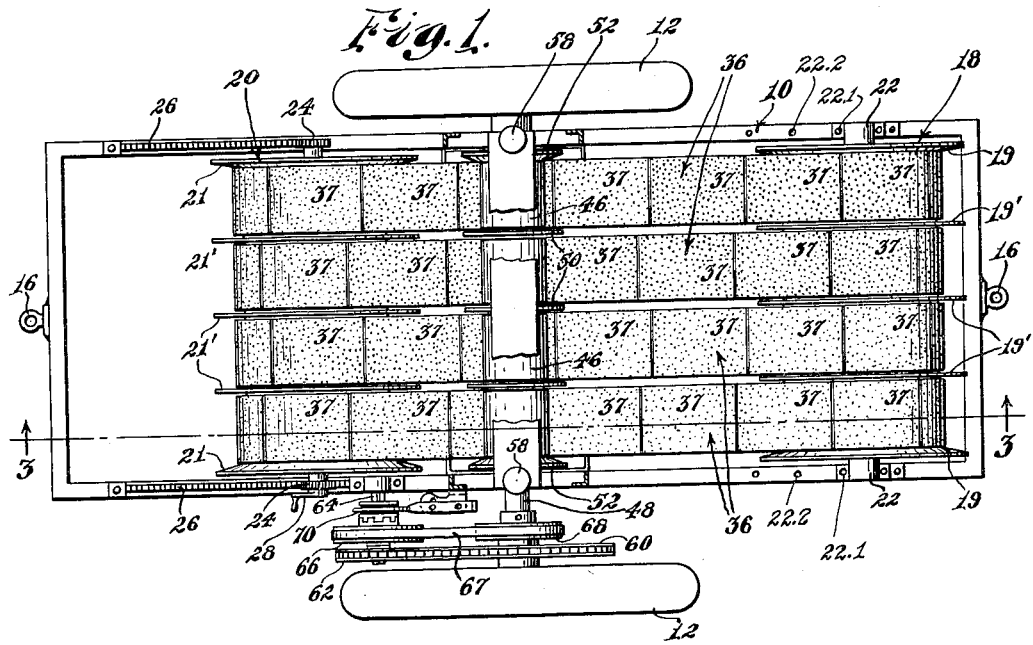
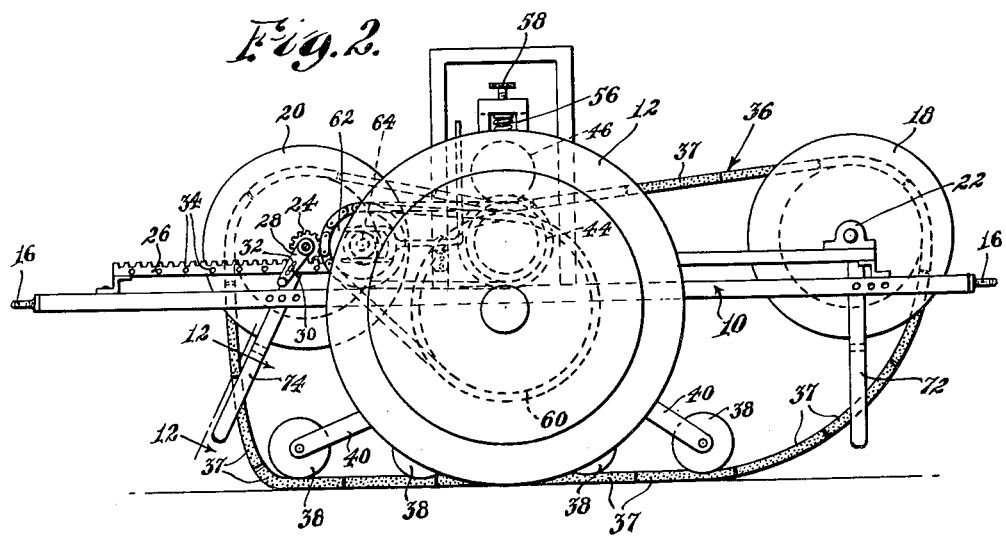
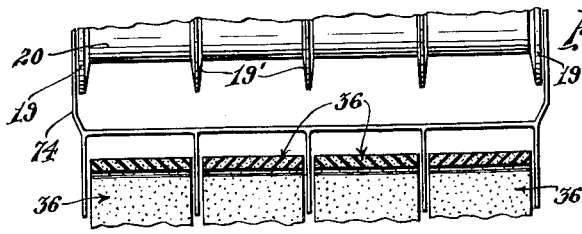
Inventor
Francis G. Jacques
By John H. McKenna
Attorney.

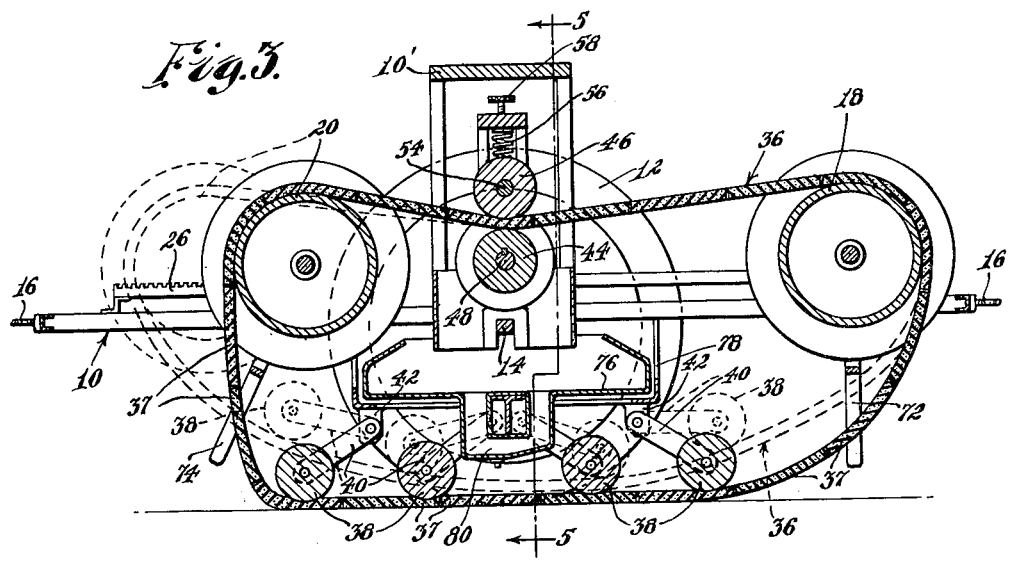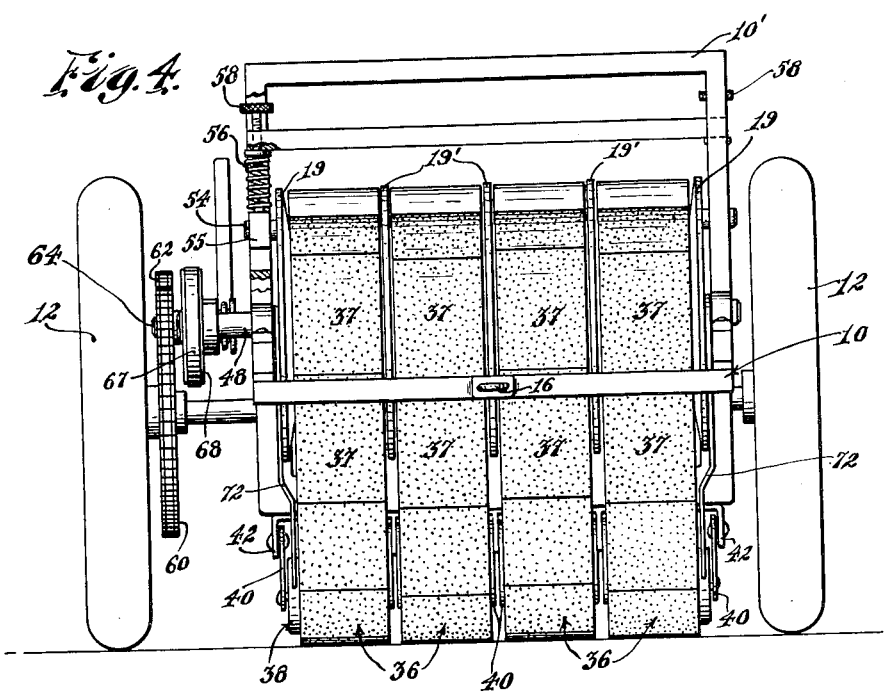

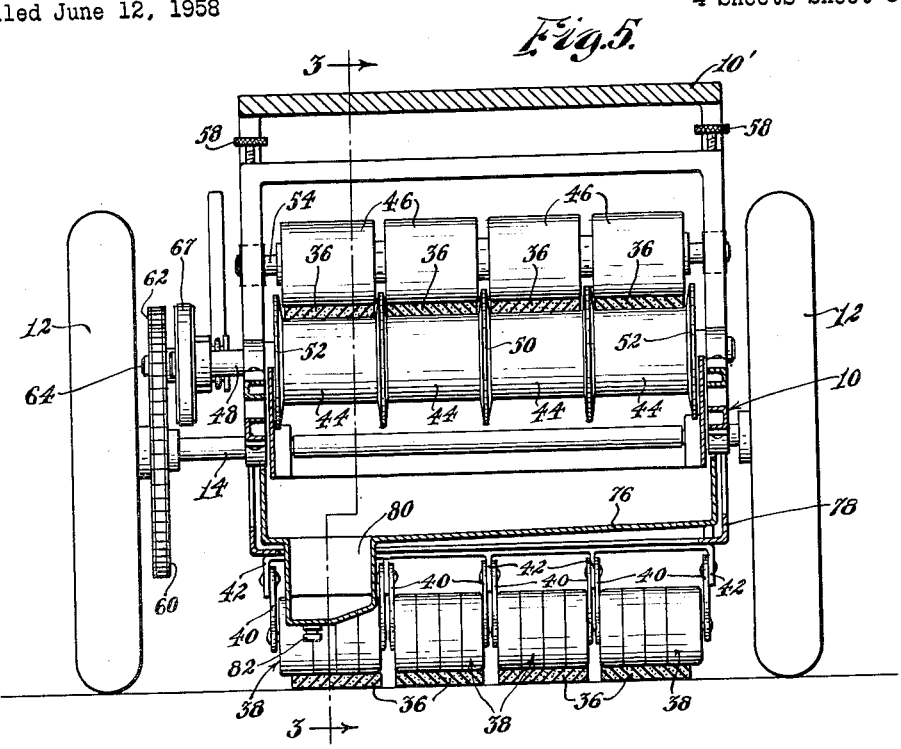
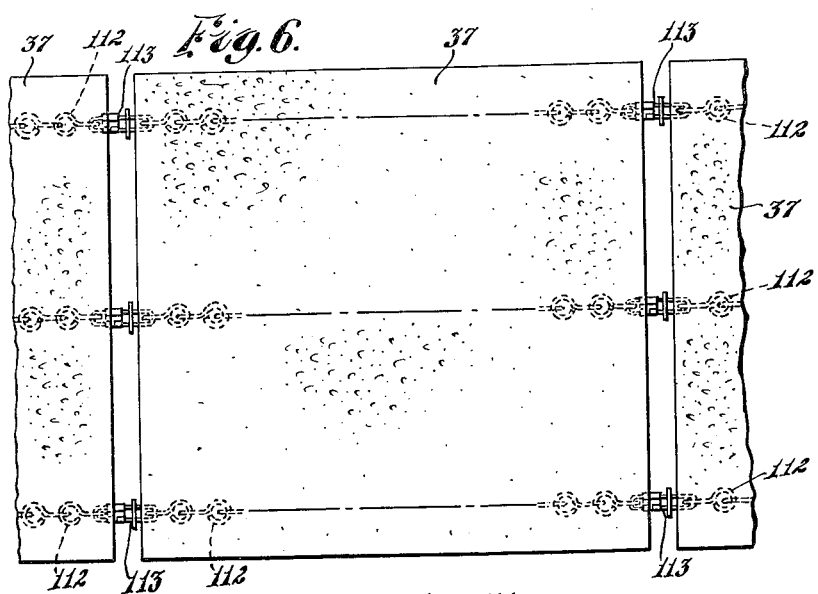
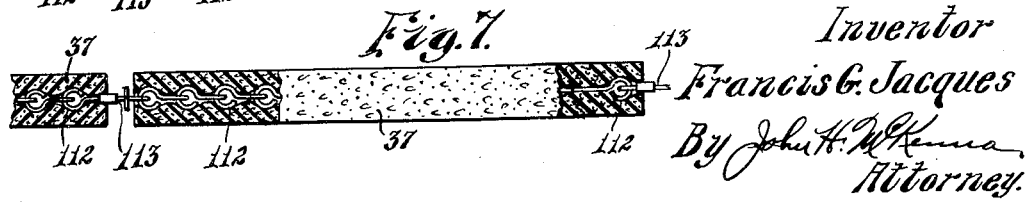
Inventor
Francis G. Jacques
By John H. McKenna
Attorney.

Sept. 4, 1962   F. G. JACQUES   3,051,973
ABSORPTIVE EARTH-DRYING APPARATUS
Filed June 12, 1958   4 Sheets-Sheet 4
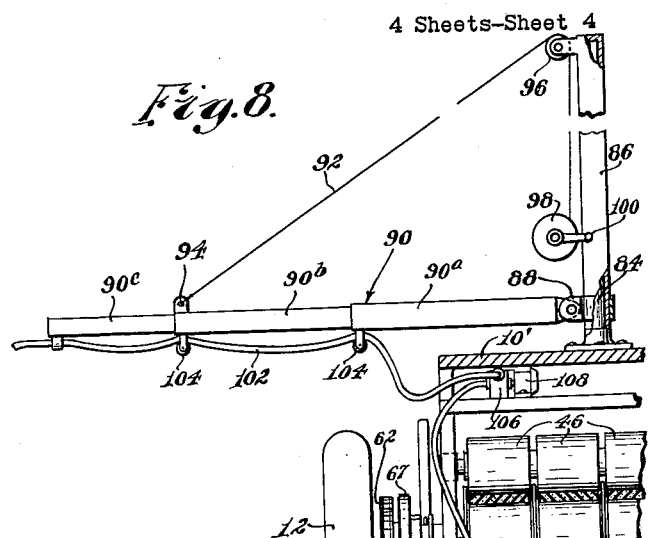
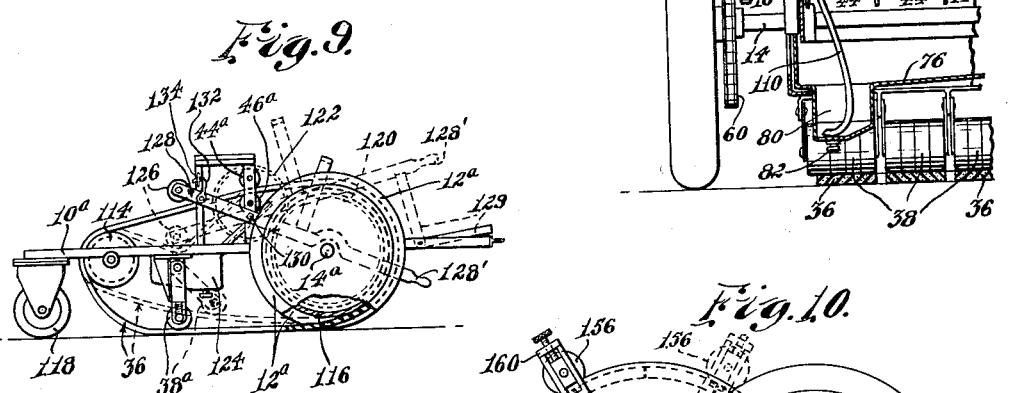
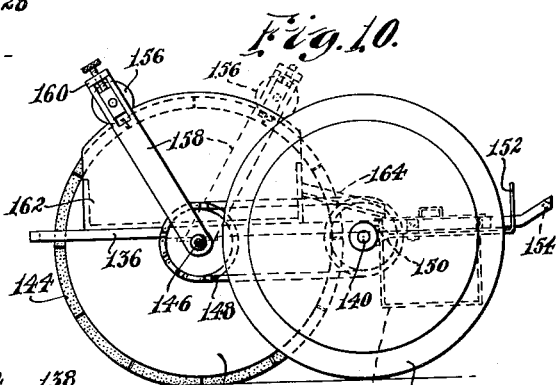
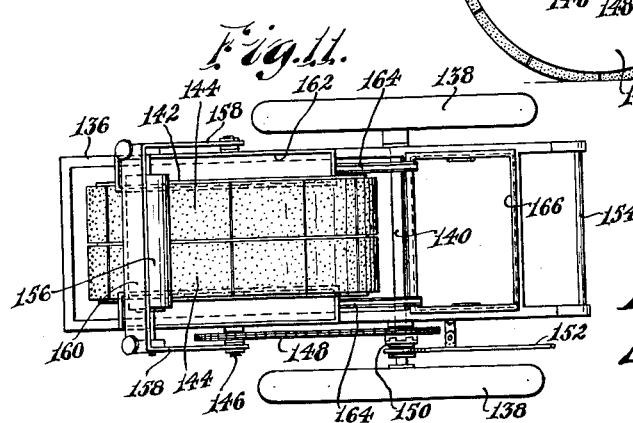
Inventor
Francis G. Jacques
By John H. McKenna
Attorney

United States Patent Office 3,051,973
Patented Sept. 4, 1962

3,051,973
ABSORPTIVE EARTH-DRYING APPARATUS
Francis G. Jacques, 416 Weld St., West Roxbury, Mass.
Filed June 12, 1958, Ser. No. 741,614
15 Claims. (Cl. 15—99)

This invention relates to absorptive earth-drying apparatus and provides, more particularly, a mobile apparatus for effectively removing water and moisture from race-tracks and other areas of ground, such as sports ovals, base-ball diamonds, playing fields and the like.

It is among the objects of the invention to provide an earth-drying apparatus wherein a belt made of absorptive material is resiliently pressed into contact with the ground as the apparatus moves along the ground and the said belt is driven to bring successive portions thereof into absorptive contact with the ground.

Another object of the invention is to provide a mobile earth-drying apparatus having traction means for supporting the apparatus for movement along an area of ground which is to be dried, and having a belt of absorptive material of which successive portions are yieldingly pressed into contact with the ground as the apparatus moves along the said area of ground.

A further object of the invention is to provide a mobile earth-drying apparatus wherein traction means supports the apparatus for movement along an area of ground, and a belt of absorptive material is yieldingly pressed and a belt of absorptive material is yieldingly pressed into contact with the ground as portions thereof, in succession, move into ground-engaging position, said ground-contacting portions of the belt traveling thence in succession through a wringer which squeezes absorbed water from each said portion prior to its next subsequent contact with the ground, and the said wringer constituting the driving means for the belt.

Yet another object of the invention is to provide a mobile earth-drying apparatus wherein traction means supports the apparatus for movement along an area of ground, and a relatively loose belt of absorptive material is driven in response to the said movement of the apparatus, with resilient means acting on the belt for pressing successive portions thereof yieldingly into contact with the ground, and means for raising the said yieldingly pressed portions of the belt away from the ground when said apparatus is moving to and from an area of ground which is to be or has been dried.

Still another object of the invention is to provide a mobile earth-drying apparatus wherein an endless series of moisture-absorbent elements is mounted for travel out of contact with the ground along which the apparatus may be moving and wherein there is a yieldable resilient means operative for pressing traveling portions of the belt in succession into contact with the ground.

A further object of the invention is to provide a mobile earth-drying apparatus wherein a continuous belt of absorptive material is selectively movable in contact with the ground or out of contact with the ground on which the apparatus may be moving, and wherein there is wringer means for the belt and means for discharging water collected from the belt to a location to one side of the apparatus and the ground over which the apparatus may be moving.

It is, moreover, my purpose and object generally to improve the structure and efficiency of mobile absorptive devices, and more especially earth-drying mobile apparatus suitable for drying race tracks, playing fields, and the like.

In the accompanying drawings:

FIG. 1 is a top plan view of an earth-drying apparatus embodying features of the invention;

FIG. 2 is a side elevation of the apparatus of FIG. 1;

FIG. 3 is an elevational view, in cross-section approximately on the line 3—3 of FIG. 1;

FIG. 4 is an end elevation looking at that end which is to the right in FIGS. 1–3, on a somewhat larger scale;

FIG. 5 is an elevational view, in cross-section approximately on the line 5—5 of FIG. 3, on the scale of FIG. 4;

FIG. 6 is a top plan view of one of the absorptive elements of a belt, on a scale substantially larger than the earlier views;

FIG. 7 is an edge view of the absorptive element of FIG. 6, with portions of the element in cross-section;

FIG. 8 is a fragmentary cross-sectional view generally similar to FIG. 5 but showing mechanism for power delivery of water to a relatively remote region;

FIG. 9 is a side elevation of a modification in which one of the belt-supporting drums is mounted on an axis which is common to the drum and to the traction wheels of the apparatus;

FIG. 10 is a side elevation of still another modification which may be designed to be manually pulled or pushed;

FIG. 11 is a top plan view of the apparatus of FIG. 10, and

FIG. 12 is a detail cross-sectional view on line 12—12 of FIG. 2.

Referring to the drawings, the embodiment of the invention illustrated in FIGS. 1–5 comprises a generally rectangular frame indicated generally at 10, supported on a pair of relatively large diameter wheels 12 on the opposite ends of an axle member 14. The axle may be located at a mid-location along the frame 10, as herein shown, or may be otherwise located. The disclosed location and arrangement of the wheels has the advantage of facilitating drawing of the apparatus substantially equally well in either direction, as by a tractor or other towing apparatus which may be suitably connected to either end of the frame 10 by means of one of the eye-devices 16, or the like.

In the preferred embodiment of the invention, two drums 18, 20 are rotatably mounted on the frame 10 and spaced from the wheel axle 14 at opposite sides thereof. As shown, the drum 18 is mounted for rotation in the adjustable bearings 22 adjacent to one end of frame 10, and the drum 20 is adjustably mounted so that its axis may be readily adjusted along the frame 10 in directions toward and from the axis of the drum 18. For this purpose, the drum 20 may have an axle or end trunnions supported, at opposite ends of the drum, in sprocket-bearings 24, each of which latter is supported on and movable along one of the racks 26 suitably supported in fixed position at opposite sides of frame 10. A handle 28 is operatively connected to one of the sprocket-bearings 24 by means of which the said bearing 24, may be manually rotated to effect a movement of drum 20 in one direction or the other along the racks 26. Any suitable means may be provided for locking the handle with the sprocket-bearings in any selective position along the racks, such as a locking pin 30 insertible through a hole or slot 32 in the handle and through one of a series of holes 34 provided in the adjacent rack 26. The adjustable bearings 22 may be located at different distances from the axis of the wheels 12 by placing the bearing retaining screws 22.1 in selected holes 22.2 in the frame 10. See FIG. 1. It should be understood however that any suitable means for adjusting the location of the drums 18 and 20 on the frame 10 are within the scope of this invention.

The drums 18, 20 rotate only in response to frictional engagement therewith of an endless belt of adsorptive material which is engaged around the two drums 18, 20 with substantial looseness of the belt whereby portions thereof may hang down from the drums and be engaged with the ground or other surface upon which the wheels 12 may be resting. The belt may be a single wide belt extending between end flanges 19 and 21 on the drums 18, 20, respectively, but I prefer to employ a series of narrower belts 36 with separating flanges between them, as at 19′ on drum 18 and 21′ on drum 20. Four of the belts 36 are herein illustrated engaged over the drums 18, 20, and each belt is made up of a multiplicity of relatively short sections 37 suitably connected together at their adjacent edges.

As best seen in FIGS. 3 and 5, gravity-actuated rollers 38 are rotatably mounted on arms 40 which are pivotally connected to depending elements 42 which are fixed relative to the frame 10. All of the rollers 38 yieldingly engage loosely hanging portions of the belts 36, pressing the engaged portions of the belts into water and moisture absorbing engagement with the ground or other support upon which the wheels 12 may be resting. As best seen in FIG. 5, a series of the rollers 38 are associated together for each of the belts 36 and the rollers which engage any particular belt are supported by their arms 40 for movements in unison about the axis of the arms and independently of the movements of the rollers 38 engaging the other belts 36. Hence, the individual belts 36 are self-adjusting to accommodate irregularities of the ground or other support independently of the rollers engaging any other one of the belts 36.

The belts 36 are advanced in unison by pairs of co-acting rolls 44, 46 which serve also as wringer rolls for squeezing water from the belts. As herein represented, there are four roll sections 44, one for each belt 36, all fixed on a shaft 48 for rotation in unison. Adjacent roll sections 44, preferably, are separated by flange elements 50, and the endmost sections 44 have flanges 52 at their outer ends. Each of the roll sections 46, four in number, is mounted on a shaft 54 which has its opposite ends suitably journaled in slidable bearing members 55 (FIG. 4) which are constantly biased toward the roller sections 44 by coil springs 56 (FIG. 3) whose tension may be adjusted by the adjusting screws 58. The flanges 50, 52 on the roll sections 44 restrain the belts against lateral displacement, and the roll sections 46 have length such that each is located between two of the said flanges.

Roll shaft 48 has drive connection with a hub portion of one of the wheels 12. As shown, a sprocket wheel 60 is fixed on the hub of one wheel 12 with a chain drive connection to a smaller sprocket 62 on a shaft 64. As represented in FIGS. 1 and 2, a pulley 66 is loose on the shaft 64 and a belt 67 is engaged over pulley 66 and over a pulley 68 fixed on roll shaft 48. A clutch element 70 is slidable along shaft 64 and is manually movable to provide driving connection between pulley 66 and sprocket 62. The size ratio of sprocket wheel 60 to sprocket 62 will be such that, when the clutch is engaged, the roll 44 will be driven with a surface speed substantially equal to the speed of travel of the apparatus along the ground.

A feature is that the belts 36 readily may be raised out of contact with the ground or other support when the apparatus is to be moved from place to place. FIG. 3 represents, in dotted lines, the belts 36 and rollers 38 in raised positions as a result of movement of the drum 20 to the left along the racks 26. This saves the belts from unnecessary wear when the apparatus is moved from place to place in an idling condition.

When the apparatus is towed, or otherwise moved along a race track, for example, with the belts pressed into moisture absorbent engagement with the ground, each belt section 37 continues in contact with the ground for a period of time equal to the time it takes the apparatus to travel a distance approximating the distance between the axes of the endmost presser-rolls 38. Hence, the belts absorb and pick up substantial amounts of water and moisture which effectively is removed from the belts as they pass between the wringer rolls 44, 46. In FIGS. 2 and 3, five of the belt sections 37 are shown simultaneously in engagement with the ground and each will be or will have been approximately at rest on the ground during the said period of time it takes the apparatus to move a distance substantially equal to the distance between the endmost presser rolls. However, when desired, the length of the belt portion which at any time is at rest on the ground may be increased by adjusting the drums 18, 20 relatively toward each other to increase the length of the loosely suspended portion of the belt, or the length of the belt or belts may be actually increased by insertion of additional sections 37. Assuming such increase to occur below the drum 18 in FIGS. 2 and 3, more of the belt at this region will engage the ground to the right of the adjacent end-most presser roll 38, and this extra length of ground-engaging belt will absorb water even though it initially is not engaged by a presser roll. The effect is to appreciably increase the period of time that each belt section 37 will be in engagement with the ground during each cycle of movement of the belt. Preferably however, as shown in FIGS. 2 and 3, the slack portion of the belt which is in water-absorbing contact with the ground should be varied by adjusting the location of both of the drums, 18 and 20, so that the portion of the belt in contact with the ground is balanced at either side of the axis of the wheels 12. In this manner the apparatus can be drawn equally well in either direction by means of the eyes 16 without necessitating the turning of the apparatus. However, if for any reason it be desirable to turn the apparatus while the belt is in contact with the ground, this can be accomplished with minimum twisting of the belt, for the reason that if the portion of the belt contacting the ground is divided equally at either side of the axis of the wheels 12, pivoting of the apparatus about a point at the center of the wheel axis will cause less belt twisting or scuffing than if a major part of the slack portion of the belt were at one side of the pivot point and were scuffed over the ground surface on a large turning radius about the pivot point.

If desired, or found necessary, guide elements 72, adjustable or not adjustable, may extend downward adjacent to opposite edges of the multiple belt 36, as a whole, and may extend at opposite edges of the individual belts, at that end of the apparatus at which drum 18 is located, and similar guide elements 74 may extend downward at the other end of the apparatus adjacent to opposite edges of the multiple belt 36, considered as a whole and, if desired, at opposite edges of the individual belts, as shown in FIG. 12.

Although the presser-rolls 38 are shown biased entirely by gravity into contact with the belts 36, it should be understood that springs may act on the roll-carrying arms 40, or additional weights may be provided if desired, to provide increased pressure on the belts.

Water squeezed from belts 36 by the wringer rolls 44, 46 may be collected by any suitable receptacle means disposed below the rolls 44. As best seen in FIG. 3, a pan type of receptacle 76 may be supported upon a depending frame part 78 below the plane of the horizontal portions of main frame 10. The receptacle may have a sump portion 80 with a suitable drain cock at 82. However, for commercial sizes of earth-drying apparatus, such as are suitable for drying race-tracks and comparable relatively large areas of ground, the quantity of water picked up by belts 36, and wrung therefrom by rolls 44, 46, will be of magnitude making it desirable to provide a means for pumping water out of the collecting receptacle and directing it a suitable distance away from the apparatus.

FIG. 8 illustrates a water ejecting means mounted on the upper portion 10′ of the frame 10. A rigid vertical post 84 has its lower end secured to the frame portion 10′, and a long sleeve 86 is rotatably supported on the post with a pair of ears 88 fixed thereon. A boom, indicated generally at 90 has one end pivotally connected to the ears 88, and an outer portion of the boom has a cable 92, or the like, connected thereto at 94 and extending upwardly and over a pulley or sheave 96 at the upper end portion of sleeve 86, the cable extending thence downwardly to a wind-up drum 98 by means of which the boom may be drawn upwardly about its pivot at the ears 88. The drum may be rotated by a crank-handle 100, or by any other suitable means, and any suitable releasable clutch means (not shown) may be associated with the drum 98 for maintaining any particular wound-up condition of the cable 92 until the clutch means is released to permit gravity-lowering of the boom. Preferably, the boom will have telescoping sections 90ª, 90ᵇ, and 90ᶜ whereby its length may be adjusted to suit particular conditions.

One end portion of a long, flexible tube or hose 102 is suitably secured to the outer end of boom 90 and the hose extends thence inwardly along the boom with means 104 on the boom slidably supporting the hose at spaced locations. The hose extends from an inner portion of the boom loosely downward to the outlet of a pump 106 suitably supported on the frame and driven by any suitable power means, such as the represented motor 108. A pipe or hose 110 has its lower end open into the sump of receptacle 76 and has its other end connected to the inlet side of pump 106. A float-controlled means (not shown) may respond to liquid level in receptacle 76 for controlling the operation of pump 106. Assuming the apparatus to be operating on a race track, for example, the collected water may be delivered through hose 102 a considerable distance away from the apparatus and the track.

The belts 36 may be formed of any suitable absorptive material. Preferably, the sectional belts as herein represented have rectangular moisture absorbent elements such as sponges 37 connected together by tensile elements 112 which extend in general parallelism through the sponges as shown in FIGS. 6 and 7. The tensile elements may be of any suitable substantially non-stretchable material. The illustrated chain-type of tensile elements 112 have served entirely satisfactorily and readily may be drawn through the sponge sections 37 by means of a relatively long needle which may be forced through a sponge to provide a passage through which a chain element may follow the needle. The chain-type tensile element has a further advantage in that they may be made in sections with an openable link element 113 connecting adjacent chain sections. This facilitates replacement of worn sponge sections 37.

Actually, when the sponge sections are dry, they contract appreciably along the tensile elements and the edges of adjacent sponge sections become substantially spaced apart on the tensile elements. However, in service, they quickly absorb water and expand to substantially close the spaces between sections, as represented in FIGS. 2 and 3.

FIG. 9 shows a modification in which the absorptive belt 36 is engaged around a relatively small drum 114 which may have a fixed position on the frame 10ª and around a larger drum 116 which is loose on the wheel axle 14ª, between two relatively large wheels 12ª which are located at one end of the FIG. 9 apparatus, there being a single relatively small caster-type wheel 118 at the opposite end of the apparatus. A pair of belt-driving wringer rolls 44ª, 46ª are mounted on an upstanding portion of the frame, the roll 44ª being driven through the meshing gears 120, 122 of which the gear 120 is concentric on the axis of wheels 12ª, for rotation in unison therewith, and gear 122 is fixed on the shaft of roll 44ª, for rotating the roll. The ratio of sizes of the gears will be selected to attain a surface speed of roll 44ª substantially equal to the rate of advance of the apparatus along the ground or other support. Water squeezed from the belt 36 by the wringer rolls 44ª, 46ª is guided into the receptacle 124 from which it may be manually drained, or it may be pumped out by means as described in connection with FIG. 8.

In FIG. 9, only one gravity actuated roll 38ª yieldingly engages the depending portion of the belt 36 for pressing the belt into contact with the ground. Obviously, additional rolls 38ª may be provided, if desired.

Raising of belt 36 out of contact with the ground may be effected, in the FIG. 9 embodiment, by a roll 126 mounted in a carrier frame indicated generally at 128. The frame 128 is shown pivotally mounted at 130 on the upstanding portion of the main frame 10ª. Roll 126 is in position to depress the upper run of belt 36 when its carrier frame is rocked counter-clockwise about its pivot at 130, as shown by dotted lines in FIG. 9 which shows also in dotted lines the lower run of belt 36 lifted away from the ground.

Carrier frame 128 may be releasably maintained in its full line position of FIG. 9 by any suitable means, such as hooks 132 on frame 10ª engaging in eyes 134 on each side arm of carrier frame 128, at each side of the apparatus. Roll 126 may be actuated to its dotted position in FIG. 9 by releasing it at the hook retainers and manually rocking the carrier frame by gripping the handle ends 128' of the side arms and pushing them upward to their dotted position and then swinging pivoted retainer arms 129 upward, for engaging as a strut under each side arm of carrier frame 128. Obviously, the carrier frame 128 may be maintained in its dotted position of FIG. 9 by any of various well known devices and the pivoted strut arms 129 are merely representative.

FIGS. 10 and 11 illustrate a modification in which a frame 136 is mounted on the wheels 138 which are fixed on the opposite ends of an axle 140. A drum 142 is rotatably journaled on frame 136 between the opposite side members of the frame, the axis of the drum being located a substantial distance along the frame from the axle 140. A belt, comprising an endless series of moisture-absorbing elements 144 is closely engaged around and secured to the surface of the drum for rotation therewith, the said belt and the wheels 138 having approximately equal outside diameter whereby the surface speeds of the belt and the wheels are substantially the same when the belt is in contact with the ground during a movement of the apparatus along the ground. Preferably the belt 144 comprises a multiplicity of rectangular sections of absorptive material, as shown in FIG. 10, which sections are individually secured to the surface of the drum 142. Thereby, the belt sections can be easily replaced if they become worn or torn. Preferably, the drum 142 will be fixed on an axle 146 with chain drive connection at 148 between the drum axle 146 and the wheel axle 140 to ensure approximately equal surface travel of the belt 144 and the wheels 138. A clutch 150 has an actuating member 152 by means of which the drum may be selectively connected or not connected to the wheel axle 140.

One end of frame 136 is provided with a cross bar or rod 154 which constitutes a hand grip by means of which the apparatus may be pulled or pushed along any ground area that is to be dried.

A single wringer roll 156 is adjustably mounted between the outer ends of two arms 158 which are pivotally mounted on the drum axle 146, one at each side of the frame 136, the outer ends of the arms being rigidly connected together by a cross member 160. Wringer roll 156 is adjusted to coact with the drum 142 to squeeze the belt 144 between them. A collecting receptacle 162 is mounted on frame 136 in position to receive water wrung from the belt at the location of roll 156, and outlet troughs 164 lead from receptacle 162 and deliver into one or more smaller containers 166 which may be removably supported on frame 136, whereby accumulated water in container or containers 166 readily may be disposed of by manual emptying of the container or containers 166.

When the apparatus of FIGS. 10 and 11 is being drawn to the right, the wringer roll preferably will be in its position as shown by dotted lines. When the apparatus is being pushed in the opposite direction, the wringer roll preferably will be swung to its full line portion as shown in FIG. 10.

In this FIGS. 10 and 11 form of the invention a two section belt may be employed, each made up of a multiplicity of absorbent elements in edge-to-edge relation.

It will be apparent that the belt-carrying drum in FIG. 10 tends by gravity to rotate counter-clockwise about the wheel axle 140, whereby the belt is naturally pressed against the ground and this pressure may be increased or decreased, as desired, by manual pressure exerted on hand grip 154. Also, the belt may be lifted clear of the ground by downward pressure on hand grip 154, as when the apparatus is being wheeled from place to place in an idling condition.

Various changes may be made in details of the disclosed apparatus within the scope of the invention as defined in the appended claims, and it is intended that the patent shall cover, by suitable expression in the appended claims, whatever features of patentable novelty exist in the invention disclosed.

I claim as my invention:

1. Earth-drying apparatus comprising a frame and a single pair of wheels supporting the frame for movement along the ground, a pair of drums mounted in spaced relation on said frame with their axes parallel, means whereby the axis of each respective drum may be adjusted toward or from the axis of the supporting wheels, an endless belt of absorbent material engaged around said drums, and including a substantial portion suspended loosely from the drums and providing a substantial length of belt in the region between the drums in position to engage the ground, presser-means engaging said suspended portion of the belt for pressing said portion of the belt into water-absorbing engagement with the ground, said presser-means being gravity-actuated, so that said belt portion will be pressed yieldingly against an uneven ground surface with constant pressure during normal operation of the apparatus, and drive means for advancing said belt in response to movement of the apparatus along the ground, said driven means comprising a part which turns with one of said wheels, and means for transmitting motion from said part to the belt such as to drive the belt at a linear speed approximating the linear speed of movement of the apparatus relatively to the ground.

2. An absorptive earth-drying apparatus comprising a frame, wheels supporting the frame for movement along the ground, a pair of freely rotatable drums mounted in spaced relation on said frame with their axes parallel, an endless belt of absorptive material engaged around said drums and including a substantial portion suspended relatively loosely from the drums to provide a substantial length of belt, at a region between the drums, in position to engage the ground, presser-means engaging said suspended portion of the belt for pressing said suspended portion yieldingly into water-absorbing engagement with the ground, a pair of wringer rolls between which the belt passes, one of said rolls being a driven roll at a fixed location for advancing the belt and the other being constantly biased toward the driven roll, a receptacle mounted on said frame for receiving water wrung from said belt, and a drive connection between one of said frame supporting wheels and said driven wringer roll for driving the latter roll with a surface speed approximating the speed of travel of the apparatus along the ground.

3. An absorptive earth-drying apparatus comprising a frame, wheels supporting the frame for movement along the ground, a pair of drums mounted in spaced relation on said frame with their axes parallel, an endless belt of absorptive material engaged around said drums and including a substantial portion suspended relatively loosely from the drums to provide a substantial length of belt, at a region between the drums, in position to engage the ground, guide means extending downwardly from said frame adjacent to each of the opposite side edges of said suspended portion of the belt, at locations under each of said drums, for restraining said suspended portion of the belt against lateral displacement, a plurality of presser rolls disposed transversely of the belt at locations spaced substantially apart in directions along the belt, each of said rolls being independently and normally biased toward the ground, each of said rolls engaging said suspended portion of the belt for pressing said portion yieldingly into water-absorbing contact with the ground, and drive means for advancing said belt in response to movement of the apparatus along the ground and at a surface speed approximating the speed of said movement of the apparatus.

4. An absorptive earth-drying apparatus comprising a frame, wheels supporting the frame for movement along the ground, a pair of drums mounted in spaced relation on said frame with their axes parallel, an endless belt of absorptive material engaged around said drums and normally including a substantial portion suspended relatively loosely from the drums thereby providing a lower run of belt of substantial length, at a region between the drums, in position to engage the ground, presser means engaging said suspended portion of the belt for normally pressing said belt portion yieldingly into water-absorbing engagement with the ground, coacting means on at least one drum and on the frame operative bodily to move said drum in a direction away from the other drum, when desired, for increasing the length of the path of travel of the belt in an upper run thereof between said drums and simultaneously reducing the length of the path of travel of said suspended portion of the belt in the lower run thereof between said drums, thereby to raise the suspended portion of the belt out of engagement with the ground, and drive means for advancing said belt in response to movement of the apparatus along the ground and at a surface speed approximating the speed of said movement of the apparatus.

5. An absorptive earth-drying apparatus comprising a frame, a single pair of wheels supporting the frame for movement along the ground, a pair of drums mounted in spaced relation on said frame with their axes parallel and spaced from the axis of the supporting wheels, said drums being independently adjustable toward or from the axis of said supporting wheels, an endless normally slack belt of absorptive material engaged around said drums and normally including a lower run of substantial length suspended relatively loosely from the drums and located in a region between the drums and in position to engage the ground, gravity-actuated presser-means engaging said suspended portion of the belt and which is operative to define an elongate, substantially rectilinear run of the belt for contact with the ground, and which normally presses said run yieldingly into water-absorbing engagement with the ground, means operative to take up a substantial portion of the slack in said belt, when desired, thereby to lift the presser means and to elevate said run of the belt out of engagement with the ground, and drive means responsive to rotation of said supporting wheels operative to impart to said belt a linear velocity approximating the linear velocity of the apparatus along the ground.

6. An absorptive earth-drying apparatus comprising a frame, wheels supporting the frame for movement along the ground, a pair of drums mounted in spaced relation on said frame with their axes parallel, an endless belt of absorptive material engaged around said drums and normally including a lower run of substantial length suspended relatively loosely from the drums, said lower run being located in a region between the drums and in position to engage the ground, presser means engaging said suspended portion of the belt for normally pressing said belt portion yieldingly into water-absorbing engagement with the ground, belt-tensioning means pivotally mounted on the frame, said belt-tensioning means being movable between a normal idling position in which it is out of engagement with said belt and a position in which it substantially depresses an upper run of said belt between said drums thereby to take up slack in said loosely suspended portion of the belt sufficient to raise said suspended portion of the belt out of engagement with the ground, and drive means for advancing said belt in response to movement of the apparatus along the ground and at a surface speed approximating the speed of said movement of the apparatus.

7. An absorptive earth-drying apparatus comprising a frame, wheels supporting the frame for movement along the ground, a pair of drums mounted in spaced relation on said frame with their axes parallel, an endless belt of absorptive material engaged around said drums and including a substantial portion suspended relatively loosely from the drums for providing a lower run of substantial length, located in a region between the drums, in position to engage the ground, presser-means engaging said suspended portion of the belt for pressing said belt portion yieldingly into water-absorbing engagement with the ground, wringer means acting on said belt to wring water therefrom, a receptacle supported on said frame in position to collect water wrung from the belt, pump means mounted on said frame with an inlet conduit connection to said receptacle and an outlet connection to a conduit leading to a remote location, whereby water collected in said receptacle may be pumped therefrom and discharged at said remote location, and drive means for advancing said belt, in response to movement of the apparatus along the ground and at a surface speed approximating the speed of said movement of the apparatus.

8. An absorptive earth-drying apparatus comprising a frame, wheels supporting the frame for movement along the ground, a pair of drums mounted in spaced relation on said frame with their axes parallel, an endless belt of absorptive material engaged around said drums and including a lower run of substantial length suspended relatively loosely from the drums, said lower run being located in a region between the drums, and in position to engage the ground, presser-means engaging said suspended portion of the belt for pressing said belt portion yieldingly into water-absorbing engagement with the ground, wringer means mounted on said frame for wringing water from said belt, a receptacle supported on said frame for collecting water wrung from the belt, a relatively long boom movably mounted on said frame and having its free end disposed relatively remote from said frame, pump means mounted on said frame with inlet conduit connection open into said receptacle and outlet connection to a conduit supported on and extending along said boom to the said free end of the boom, whereby water collected in said receptacle may be pumped therefrom and discharged from said conduit at said location remote from said frame, and drive means for advancing said belt in response to movement of the apparatus along the ground and at a surface speed approximating the speed of said movement of the apparatus.

9. An absorptive earth-drying apparatus comprising a frame, wheels supporting the frame for movement along the ground, a pair of drums mounted in spaced relation on said frame with their axes parallel, an endless belt of absorptive material engaged around said drums and including a lower run of substantial length suspended relatively loosely from the drums and located in a region between the drums and in position to engage the ground, presser-means engaging said suspended portion of the belt for pressing said belt portion yieldingly into water-absorbing engagement with the ground, wringer means mounted on said frame for wringing water from said belt, a receptacle supported on said frame for collecting water wrung from the belt, a boom movably mounted on said frame with its free end portion adapted to be disposed relatively remote from said frame, said boom having a plurality of telescoping sections whereby its length may be adjusted, pump means mounted on said frame and having an inlet conduit connection opening into said receptacle and an outlet connection to a conduit supported on and extending along said boom to said remote end of the boom, whereby water collected in said receptacle may be pumped therefrom and discharged at a location remote from the frame, and drive means for advancing the belt in response to motion of the apparatus along the ground.

10. An absorptive earth-drying apparatus comprising a frame, a single pair of wheels located approximately midway between the ends of the frame, said wheels being rotatable about a common axis and being operative to support the frame for movement along the ground, said wheels being of a diameter such as to support the frame at a substantial elevation above the ground, a pair of drums mounted in spaced relation on the frame with their axes parallel to the axis of said wheels and forwardly and rearwardly, respectively, of said wheel axis, means whereby the axis of each respective drum may be adjusted toward or from the axis of the supporting wheels, an endless belt of absorptive material engaged around said drums and normally including a lower run of substantial length suspended relatively loosely from the drums and located in a region between the drums, in position to engage the ground, presser-means engaging said suspended portion of the belt for pressing said portion yieldingly into water absorbing engagement with the ground, means for adjusting at least one of said drums along the frame relative to the other and to the axis of said wheels whereby the effective length of the suspended portion of the belt which engages the ground can be varied, and drive means for advancing said belt, said drive means comprising a part which is arranged to turn with one of said wheels, and means for transmitting motion from said part to the belt, said motion-transmitting means being so constructed and arranged as to drive the belt at a linear velocity approximating the linear velocity of movement of the apparatus along the ground, thereby to prevent abrasive contact of the belt with the ground.

11. An absorptive earth-drying apparatus comprising a frame, a single pair of wheels supporting the frame for movement along the ground, a pair of drums mounted in spaced relationship on said frame with their axes parallel and forwardly and rearwardly, respectively, of the wheel axis, and means whereby said drums may be adjusted toward or from the wheel axis, a plurality of endless slack belts engaged around said drums in edge-to-edge relationship and each including a lower, substantially rectilinear run of substantial length suspended loosely from the drums in a region between the drums, in position to engage the ground, each of said belts comprising a multiplicity of rectangular sections of absorptive material disposed in edge-to-edge relationship on a plurality of laterally-spaced, endless, tensile elements, presser-means normally engaging the suspended run of each belt for pressing said run yieldingly into water-absorbing engagement with the ground, and drive means for advancing said belts in unison in response to movement of the apparatus along the ground, said drive means comprising gearing for transmitting motion from one of said wheels to the belt, said gearing being so devised as to move the belt at a linear speed approximating the linear speed of movement of the apparatus along the ground, thereby to prevent abrasive contact of the belt with the ground.

12. An absorptive earth-drying apparatus as set forth in claim 11 wherein each of said belts comprises a multiplicity of rectangular sponges in edge-to-edge relationship, each of said sponges being provided with a plurality of laterally spaced tensile elements which extend edgewise through the sponge, said multiplicity of sponges being detachably connected, in sequence, by means of said tensile elements, to form an endless belt.

13. An absorptive earth-drying apparatus comprising a frame, wheels supporting the frame for movement along the ground, a pair of drums mounted in spaced relation on said frame with their axes parallel, a plurality of endless belts of absorptive material engaged around said drums in edge-to-edge relation, each belt including a lower run of substantial length suspended relatively loosely from the drums in a region between the drums, in position to engage the ground, presser-means engaging said suspended portion of each belt for pressing said belt portion yieldingly into water-absorbing engagement with the ground, a pair of wringer rolls between which all of said belts extend, one of said rolls being a driven roll at a fixed location for advancing the belts in unison, said one roll being divided into section by annular guide flanges of larger diameter than the roll proper to provide separate paths for the respective belts, the other roll being constantly biased toward the driven roll and being provided with annular grooves for accommodating the driven-roll flanges, a receptacle mounted on said frame for receiving water wrung from said belts, and a drive connection between one of said frame-supporting wheels and the driven wringer roll and driving the latter roll with a surface speed approximating the speed of travel of the apparatus along the ground.

14. An absorptive earth-drying apparatus as set forth in claim 13 wherein said presser-means comprises a plurality of pairs of rolls, each roll having its axis extending transversely of the respective belt, the roll of each pair being spaced substantially apart longitudinally of the belt, each of said rolls being independently suspended from the frame and biased toward the ground by the force of gravity, whereby each belt will be yieldingly conformed to the ground surface which it contacts regardless of the contour of ground surfaces traversed by the apparatus.

15. An absorptive earth-drying apparatus as set forth in claim 13 wherein each of said freely rotatable drums is provided with an annular flange, of larger diameter than the drum proper, at each end for preventing lateral displacement of said belts thereon.

References Cited in the file of this patent

UNITED STATES PATENTS

| | | |
|---|---|---|
| 1,000,699 | Seyferth | Aug. 15, 1911 |
| 1,278,606 | Deam | Sept. 10, 1918 |
| 1,813,026 | Coole | July 7, 1931 |
| 1,991,324 | Keech | Feb. 12, 1935 |
| 2,207,278 | Albrecht | July 9, 1940 |
| 2,874,397 | Hirak | Feb. 24, 1959 |

FOREIGN PATENTS

| | | |
|---|---|---|
| 16,262 | Great Britain | Jan. 13, 1910 |
| 371,524 | Great Britain | Apr. 28, 1932 |
| 415,496 | Great Britain | Mar. 16, 1934 |